(12) United States Patent
Vanderwende et al.

(10) Patent No.: US 9,880,988 B2
(45) Date of Patent: Jan. 30, 2018

(54) VALIDATION, REJECTION, AND MODIFICATION OF AUTOMATICALLY GENERATED DOCUMENT ANNOTATIONS

(71) Applicant: Microsoft Corporation, Redmond, WA (US)

(72) Inventors: Lucretia Henrica Vanderwende, Sammamish, WA (US); Oscar Gerardo Naim, Redmond, WA (US); Krist Wongsuphasawat, Silver Spring, MD (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 859 days.

(21) Appl. No.: 14/229,209

(22) Filed: Mar. 28, 2014

(65) Prior Publication Data

US 2014/0215305 A1 Jul. 31, 2014

Related U.S. Application Data

(63) Continuation of application No. 13/045,540, filed on Mar. 11, 2011, now Pat. No. 8,719,692.

(51) Int. Cl.
*G06F 17/24* (2006.01)
*G06F 17/27* (2006.01)
*G06F 3/0484* (2013.01)

(52) U.S. Cl.
CPC ........ *G06F 17/241* (2013.01); *G06F 3/04842* (2013.01); *G06F 17/2765* (2013.01)

(58) Field of Classification Search
CPC ..................................................... G06F 17/241
USPC ........................................................ 715/230
See application file for complete search history.

(56) References Cited

U.S. PATENT DOCUMENTS

| 4,864,502 | A | 9/1989 | Kucer et al. |
|---|---|---|---|
| 6,076,088 | A | 6/2000 | Paik et al. |
| 6,263,335 | B1 | 7/2001 | Paik et al. |
| 6,871,199 | B1 | 3/2005 | Binnig et al. |
| 7,555,713 | B2 | 6/2009 | Yang |
| 7,778,982 | B2 | 8/2010 | Baker |
| 8,265,925 | B2 | 9/2012 | Aarskog |
| 2004/0122846 | A1 | 6/2004 | Chess et al. |
| 2004/0181389 | A1 | 9/2004 | Bourigault et al. |
| 2004/0243614 | A1 | 12/2004 | Boone et al. |

(Continued)

OTHER PUBLICATIONS

Joosse, W., "User Trainable Fact", Retrieved at << http://hmi.ewi.utwente.nl/verslagen/afstudeer/JoosseWouterFinalThesis.pdf >>, Jun. 2007, pp. 1-86.

(Continued)

*Primary Examiner* — Frank D Mills
(74) *Attorney, Agent, or Firm* — Medley, Behrens & Lewis, LLC (57) ABSTRACT

A mixed-initiative annotation framework is described herein. A document that includes several sentences is presented to a user, and an extractor module analyzes at least one sentence and automatically extracts a subject, predicate, object triple therefrom. The subject, predicate, object triple is displayed in graphical relation with the sentence as a proposed annotation to the sentence. Graphical options are presented to the user that allow the user to accept the proposed annotation, reject the proposed annotation, or modify the proposed annotation.

20 Claims, 6 Drawing Sheets

(56) References Cited

U.S. PATENT DOCUMENTS

| | | |
|---|---|---|
| 2005/0027664 A1* | 2/2005 | Johnson .............. G06F 17/2827 706/12 |
| 2005/0043940 A1 | 2/2005 | Elder |
| 2005/0108001 A1 | 5/2005 | Aarskog |
| 2005/0108630 A1* | 5/2005 | Wasson ................ G06F 17/241 715/230 |
| 2005/0267871 A1 | 12/2005 | Marchisio et al. |
| 2005/0273314 A1 | 12/2005 | Chang et al. |
| 2006/0026203 A1 | 2/2006 | Tan et al. |
| 2006/0282762 A1* | 12/2006 | Diamond .............. G06F 17/241 715/235 |
| 2007/0005592 A1* | 1/2007 | Kender ................... G06N 5/02 |
| 2007/0150800 A1 | 6/2007 | Betz et al. |
| 2007/0179776 A1 | 8/2007 | Segond et al. |
| 2008/0010274 A1* | 1/2008 | Carus ................... G06N 99/005 |
| 2008/0027888 A1 | 1/2008 | Azzam et al. |
| 2008/0082499 A1 | 4/2008 | Koski |
| 2008/0098294 A1* | 4/2008 | Le .......................... G06F 17/241 715/230 |
| 2009/0070322 A1 | 3/2009 | Salvetti et al. |
| 2009/0083026 A1 | 3/2009 | Morsy et al. |
| 2009/0248400 A1 | 10/2009 | Luke |
| 2009/0271179 A1 | 10/2009 | Marchisio et al. |
| 2010/0031135 A1* | 2/2010 | Naghshin .............. G06Q 10/10 715/230 |
| 2010/0031141 A1 | 2/2010 | Summers et al. |
| 2010/0063799 A1* | 3/2010 | Jamieson .......... G06F 17/30731 704/9 |
| 2010/0138216 A1 | 6/2010 | Tanev |
| 2010/0153324 A1 | 6/2010 | Downs |
| 2010/0169299 A1 | 7/2010 | Pollara |
| 2010/0174704 A1 | 7/2010 | Ciravegna et al. |
| 2010/0185700 A1 | 7/2010 | Bodain |
| 2010/0228693 A1 | 9/2010 | Dawson et al. |
| 2010/0228782 A1 | 9/2010 | Rao et al. |
| 2010/0293451 A1 | 11/2010 | Carus |
| 2011/0113320 A1* | 5/2011 | Neff ...................... G06Q 10/10 715/230 |
| 2011/0119613 A1 | 5/2011 | Zhu et al. |
| 2011/0153539 A1 | 6/2011 | Rojahn |
| 2011/0161070 A1* | 6/2011 | Chen .................. G06F 17/2785 704/9 |
| 2011/0191098 A1 | 8/2011 | Thomas et al. |
| 2011/0208728 A1 | 8/2011 | Ikawa et al. |
| 2011/0231382 A1 | 9/2011 | Xu |
| 2011/0246461 A1 | 10/2011 | Jung et al. |
| 2012/0102456 A1 | 4/2012 | Paulheim et al. |
| 2012/0143860 A1 | 6/2012 | Gherman et al. |
| 2012/0233150 A1 | 9/2012 | Naim et al. |
| 2012/0233151 A1 | 9/2012 | Vanderwende et al. |
| 2012/0233534 A1 | 9/2012 | Vanderwende et al. |
| 2012/0233558 A1 | 9/2012 | Naim et al. |
| 2012/0284259 A1* | 11/2012 | Jehuda .............. G06F 17/30734 707/722 |

OTHER PUBLICATIONS

Yangarber, "Acquisition of Domain Knowledge," Springer-Verlag, SCIE 2002 LNAI 2700, 2003, pp. 1-28.

Yangarger et al., "Automatic Aquisition of Domain Knowledge for Information Extracation," ACM, COLING '00 Proceedings of the 10th Conference of Computational Linguistics vol. 2, 2000, pp. 940-946.

Stevenson et al., "Comparing Information Extraction Pattern Models," ACL, Proceedings of the Workshop on Information Extraction Beyond the Document, 2006, pp. 12-19.

* cited by examiner

VALIDATION, REJECTION, AND MODIFICATION OF AUTOMATICALLY GENERATED DOCUMENT ANNOTATIONS

RELATED APPLICATION

This application is a continuation of U.S. patent application Ser. No. 13/045,540, filed on Mar. 11, 2011, and entitled "VALIDATION, REJECTION, AND MODIFICATION OF AUTOMATICALLY GENERATED DOCUMENT ANNOTATIONS", the entirety of which is incorporated herein by reference.

BACKGROUND

Reviewers of documents often write annotations in the margins of pages of the documents that are being read. These annotations can indicate a reviewer's thoughts on a particular passage in a document, can highlight a portion of the document that the reviewer finds important, etc. Thereafter, if the reviewer subsequently reviews an annotated document, the reviewer can quickly locate portions of the document that the reviewer previously found to be important and can review annotations in the margins to refresh the memory of the reviewer.

In a particular example, a researcher (one who is researching a particular topic to generate a research paper) can read numerous documents and can annotate several of such documents in connection with generating a new research paper that is germane to the topics that are discussed in the documents being reviewed by the researcher. When composing the resulting research paper, the researcher can review the multiple annotations made to the documents for purposes of citation and analysis.

In another example, students often annotate text books or articles in an effort to improve memory regarding a particular topic that is discussed in the text book or articles. Thus, when a student attempts to commit a particular topic to memory, the student need not re-read the entire portion of a textbook, but can quickly review previously made annotations.

Some word processing applications have been configured with functionality that supports the addition of annotations to documents, wherein such annotations can be stored as part of the documents. For example, the user can highlight a particular portion of an electronic document and then choose to add a comment to such portion of the electronic document. The comment, for instance, may be displayed in a bubble in a margin of the electronic document. Additionally, some web-based applications allow users to assign tags to web pages, images, or the like. For example, a user can choose to bookmark a particular web page, assign descriptive terms to the bookmark, and then cause such bookmark to be shared with others by way of a web-based application. Other forms of tagging include the addition of metadata to documents in order to introduce information to machine learning systems for training It can be ascertained that these systems that facilitate annotating documents are restricted to user-initiated tags. Accordingly, for a large document collection, this tagging process can be relatively inefficient. Moreover, typically tags assigned by users to documents are in the form of an unstructured text string, which makes processing these annotations cumbersome.

SUMMARY

The following is a brief summary of subject matter that is described in greater detail herein. This summary is not intended to be limiting as to the scope of the claims.

Described herein are various technologies pertaining to a mixed-initiative annotation framework, wherein extractor modules can be utilized to automatically propose annotations to documents and a user can validate, reject or modify proposed annotations. Once an annotation has been validated by the user, the user may choose to share such annotation with others. For instance, the user can choose to publish the annotations to a data repository that is accessible to others, such that the others can perform searches over the annotations in the data repository, for example.

With more specificity, an extractor module can be configured to search documents for particular text (words or phrases), a particular sentence structure, or the like, and can automatically generate an annotation of a particular format once the particular text, sentence structure, etc. has been located. The extractor module is configured to output or generate annotations of a particular format. More particularly, the extractor module is configured to generate a tuple, wherein the tuple comprises a first word or phrase, a second word or phrase, and a third word or phrase that relates the first word or phrase to the second word or phrase. In an example, the first word or phrase can be a subject of a sentence, the second word or phrase can be an object of the sentence, and the third word or phrase can be a predicate that relates the subject to the object.

It is to be understood that various extractor modules can be executed over the document, such that many different types of annotations can be automatically generated. For instance, a first extractor module can be configured to search for a first particular word or phrase and generate annotations for the portions of the document that include the first particular word or phrase, while a second extractor module can be configured to search for a second word or phrase and generate annotations for portions of the document that include the second word or phrase.

Subsequent to one or more extractor modules generating annotations for the document, the user can be provided with a plurality of selectable graphical objects, wherein such graphical objects correspond to validation, rejection or modification of at least one annotation. For instance, the user can be provided with several annotation options for a portion of the document, wherein such options are automatically located by one or more extractor modules. Through selection of a radio button, the user can select one of the options to include in the annotation and may thereafter select another graphical button to validate the modified annotation. In another example, at least one of the graphical objects can be a text entry field, wherein a user can manually generate a portion of the tuple to replace the portion of the tuple that was automatically located by the extractor module. In still yet another example, the user may select a particular portion of the document and can manually generate an annotation without the aid of an extractor module. Again, this annotation can be in the form of the tuple described above, such that the annotation includes a first word or phrase, a second word or phrase, and a third word or phrase that relates the first word or phrase to the second word or phrase.

Subsequent to the user validating one or more annotations in the document, the user may choose to publish the one or more annotations such that the annotations can be accessed and analyzed by others to locate relationships between documents, topics etc. For instance, the user may choose to publish annotations pertaining to a particular document, and a data packet can be automatically transmitted to a data store that is accessible to others responsive to the user choosing to publish the annotation. The data packet can comprise the annotation (the tuple) and can further comprise relationship data, wherein the relationship data includes data that relates the annotation to at least one attribute of the document. For instance, the relationship data can include first data that identifies the document to which the annotation was assigned, second data that identifies the portion of the document to which the annotation was assigned, third data that identifies an author of the document to which the notation was assigned, fourth data that identifies the author of the annotation, amongst other relationship data. Since the annotations are in the form of the tuple described above, such annotations can be placed in a database that is suitable for processing by a processor, thereby allowing the database to be readily queried or the like to visualize relationships between documents, annotators, annotations, etc.

Other aspects will be appreciated upon reading and understanding the attached figures and description.

DETAILED DESCRIPTION

Various technologies pertaining to annotating electronic documents will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

Figure 1:
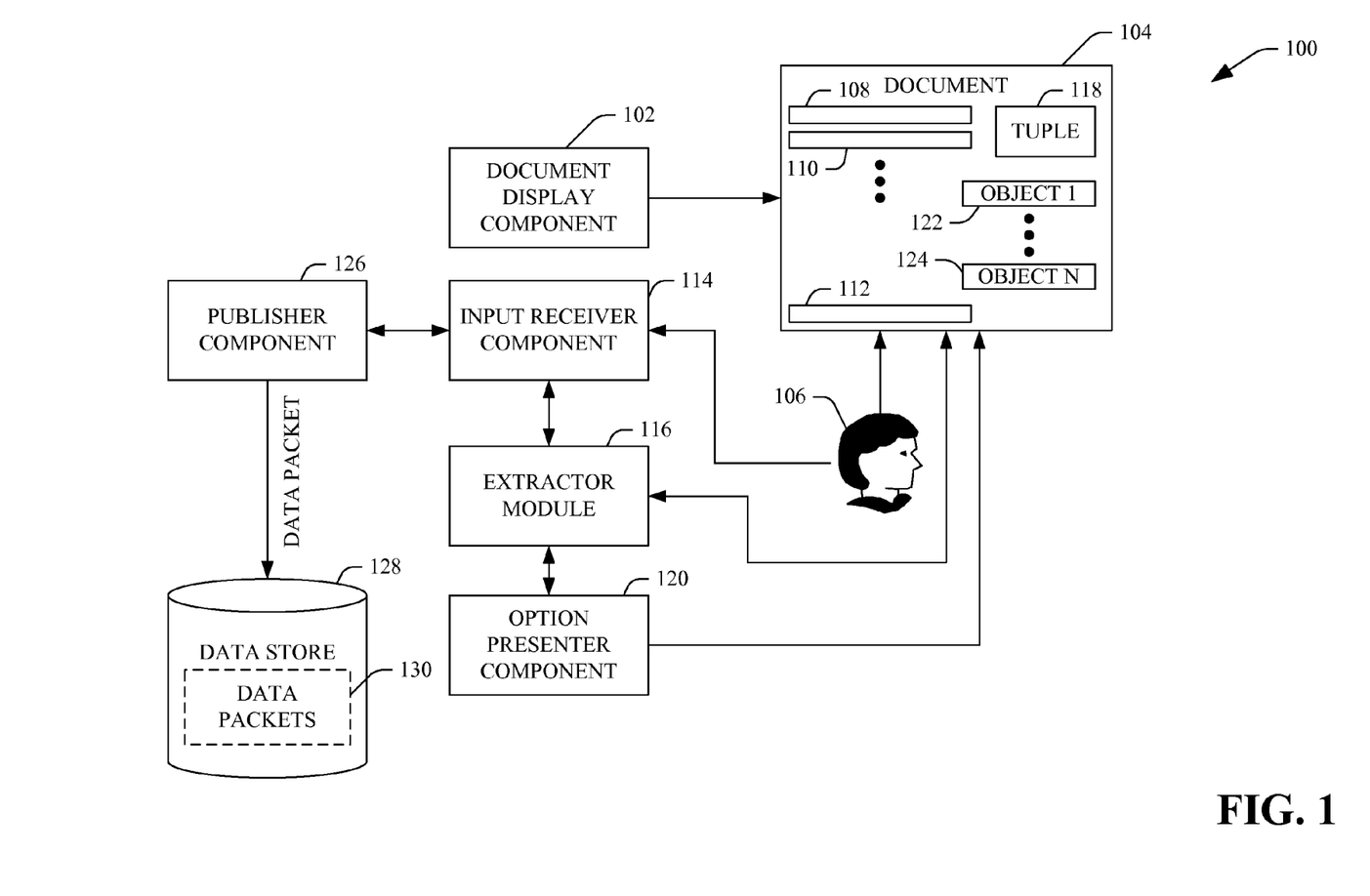
FIG. 1 is a functional block diagram of an exemplary system that facilitates assigning annotations to a document.

With reference to FIG. 1, an exemplary system 100 that facilitates annotation of documents is illustrated. The system 100, for example, may be comprised by a client computing device such as a desktop computer, a laptop computer, a portable computing device such as a mobile telephone, or the like. In another example, the system 100 may be comprised by a server that is accessible to a user. For instance, the system 100 may be comprised by an application executing on such server, wherein the application is accessible to users by way of an Internet browser. The system 100 comprises a document display component 102 that causes a document 104 to be displayed on a display screen of a computing device. For instance, the document display component 102 can cause the document 104 to be displayed to a user 106 responsive to the user 106 selecting the document 104 from one or more available documents retained in a data repository. For instance, the user 106 can select a graphical icon that corresponds to the document 104, which can cause the document display component 102 to display the document 104 to the user 106 on the display screen of the computing device. In another example, the user 106 can initiate an application that is configured for viewing/annotating documents and can select the document 104 through utilization of pull-down menus, etc. The document 104 comprises multiple different portions 108-112. A portion of the document 104 may be a sentence, a paragraph, a page, or the like.

An input receiver component 114 can receive input from the user 106 pertaining to the document 104. An extractor module 116 is in communication with the input receiver component 114, and automatically generates an annotation responsive to the input receiver component 114 receiving the input from the user 106. For instance, the input from the user 106 can indicate that the user wishes that the extractor module 116 execute over one of the portions 108, 110, or 112 of the document 104 or all portions 108, 110, and 112 of the document 104. Therefore, for example, the input receiver component 114 can receive a selection from the user 106 of one of the portions 108-112 of the document 104. The user 106 can select a particular portion of the document 104 through utilization of a cursor, a touch, a gesture, a spoken command, or the like.

The extractor module 116 is a computer-executable program that automatically generates annotations in a particular format based at least in part upon some predefined criteria. For example, the extractor module 116 may be configured to search for portions of the document 104 that have a particular sentence structure, that have a particular word or phrase included therein, that have a citation to another document included therein, etc. For instance, the extractor module 116 can be configured to search for a particular biological term in the portions 108-112 of the document 104, and may generate annotations for the portions 108-112 of the document that include such biological term. In another example, the extractor module 116 may be configured to search for sentences that include some notion of causation—that a first entity causes a particular response. In still yet another example, the extractor module 116 can be configured to search for citations to other documents in the document 104 and can automatically generate annotations for portions of the document 104 that include a citation. It is therefore to be understood that the extractor module 116 can be configured to automatically generate annotations for portions of the document 104 that include or meet some predefined criteria that corresponds to the extractor module 116.

Further, the user 106 can select the extractor module 116 from amongst a plurality of available extractor modules. Therefore, a plurality of extractor modules can be made available to the user 106, and the user 106 can select the extractor module 116 based upon the predefined criteria that corresponds to the extractor module 116, such that the extractor module 116 automatically generates annotations for portions of the document that meet or include the predefined criteria. Additionally, the user 106 can indicate that the extractor module 116 is to execute over all portions 108-112 of the document 104, or the user 106 can indicate that the user 106 wishes that the extractor module 116 execute only over a portion of the document 104 that was specifically selected by the user 106. Subsequent to the input receiver component 114 receiving such input, the extractor module 116 is configured to extract a tuple 118 from at least one of the portions 108-112 of the document 104, and cause such tuple 118 to be displayed in the document 104 in graphical relation to the portion of the document 114 from which the tuple 118 was extracted. A tuple is an ordered list of elements, and the elements of the tuple extracted by the extractor module 116 from the document 104 comprise a first word or phrase, a second word or phrase, and a third word or phrase that relates the first word or phrase to the second word or phrase. It is to be understood that the ordering of these elements in a tuple extracted by the extractor module 116 can be any suitable ordering, so long as such ordering is consistent across tuples. With respect to displaying the tuple 118 in graphical relation to the portion of the document from which the tuple 118 was extracted, such portion of the document 104 can be highlighted, thereby providing the user 106 with a visual indication that the portion of the document corresponds to the tuple 118. Alternatively, the tuple 118 can be presented as a bubble that is displayed in relation to the portion of the document 104. Other manners for displaying annotations in graphical relations to portions of the document 104 from which the annotations were extracted are contemplated by the inventors and are intended to fall under the scope of the hereto-appended claims.

It can be ascertained that even the most sophisticated extractor module may be imperfect in all contexts. Accordingly, the system 100 can comprise an option presenter component 120 that is in communication with the extractor module 116, wherein the option presenter component 120 causes a plurality of graphical objects 122-124 to be displayed to the user in the document 104 in graphical relation with the tuple 118. For instance, the plurality of objects 122-124 can be displayed in the same field as the tuple 118. In another example, the plurality of objects 122-124 can be displayed in a field in the document 104 that is adjacent to a field that includes the tuple 118.

The plurality of graphical objects 122-124 correspond to a plurality of different options, wherein the options allow the user 106 to validate the tuple 118, reject the tuple 118, or modify the tuple 118. Pursuant to an example, the extractor module 116 can be configured to extract a subject, predicate, object, triple from a portion of the document 104, wherein such portion is a sentence. That is, the extractor module 116 can be configured with natural language processing functionality that allows the extractor module 116 to identify the subject of a sentence, the predicate in the sentence, and the object in the sentence. In some situations, however, there may be multiple possible subjects, objects, or predicates in a sentence, and the extractor module 116 can present the tuple 118 in the document 104 as the most likely subject, object, predicate, triple. The extractor module 116, however, can also identify other options for the subject, the object, or the predicate of the sentence. These other possible subjects, objects, and/or predicates can be presented to the user 106 by the option presenter component 120 in the form of one or more selectable graphical objects. For instance, the graphical objects 122-124 can include a plurality of radio buttons that correspond to different options for different elements of the tuple 118. The user 106 may select one or more of these radio buttons to replace elements in the tuple 118 with other possible elements presented to the user 106 by the option presenter component 120.

In another exemplary embodiment, the graphical objects 122-124 can include a button that, when depressed by the user 106, can cause the tuple 118 to be validated by the user 106. For example, the extractor module 116 may have generated an annotation that the user 106 wishes to be assigned to the document 104, and the user 106 can depress the aforementioned graphical button to cause the tuple 118 to be validated. In still yet another exemplary embodiment, the graphical objects 122-124 can include a text entry field or multiple text entry fields, wherein the user 106 can replace one or more of the elements of the tuple 118 by manually generating a replacement element for the tuple 118. As mentioned previously, the extractor module 116 may be configured to extract subject, object, predicate, triples from sentences in the document 104. The user 106, however, may wish to annotate a sentence with words/phrases that are not included in such sentence. Accordingly, the user 106 can utilize a text entry field to manually generate one or more of the elements of the tuple 118 and cause one or more elements in the tuple 118 generated by the extractor module 116 to be replaced. Various other exemplary graphical objects such as sliders, radio buttons, text entry fields, check boxes, and the like are contemplated by the inventors and are intended to fall under the scope of the hereto appended claims with respect to graphical objects that can be utilized in connection with validating, rejecting, or modifying tuples output by an extractor module such as the extractor module 116.

The system 100 may also optionally include a publisher component 126 that is configured to publish tuples that have been validated by the user 106 responsive to receipt of commands from the user 106 to publish such annotations. For example, the input receiver component 114 can receive a request from the user 106 to publish validated annotations in the document 104 and, responsive to the input receiver component 114 receiving such request from the user 106, the publisher component 126 can generate a data packet and cause such data packet to be transmitted by way of a network to a data store 128 that is accessible to others. There the data packet can be aggregated with other data packets 130 of substantially similar format. A data packet generated by the publisher component 126 can include at least one tuple that has been assigned to the document 104 and validated by the user 106 (e.g., with or without user modification) and relationship data that indicates a relationship between the tuple 118 and at least one attribute of the document 104. For example, the relationship data can comprise at least one of first data that identifies the document 104 to which the tuple 118 has been assigned, second data that identifies a portion of the document 104 to which the tuple 118 has been assigned, third data that identifies the author of the document 104 to which the tuple 118 has been assigned, fourth data that identifies the annotator (the user 106), amongst other data that can relate the tuple 118 to the document 104. Aggregating the plurality of data packets 130 from a plurality of different users across varying documents can generate a network of knowledge that has heretofore been unavailable.

Pursuant to an example, the document 104 can be a word processing document. Accordingly a document display component 102, input receiver component 114, the extractor module 116, the option presenter component 120, and the publisher component 126 can be included in a word processing application that is executing on a client computing device being utilized by the user 106, or on a server that is accessible to the user by way of an Internet browser. In another example, the document 104 may be a web page. Therefore, the document display component 102, the input receiver component 114, the extractor module 116, the option presenter component 120, and the publisher component 126 can be comprised by a web browser.

Figure 2:
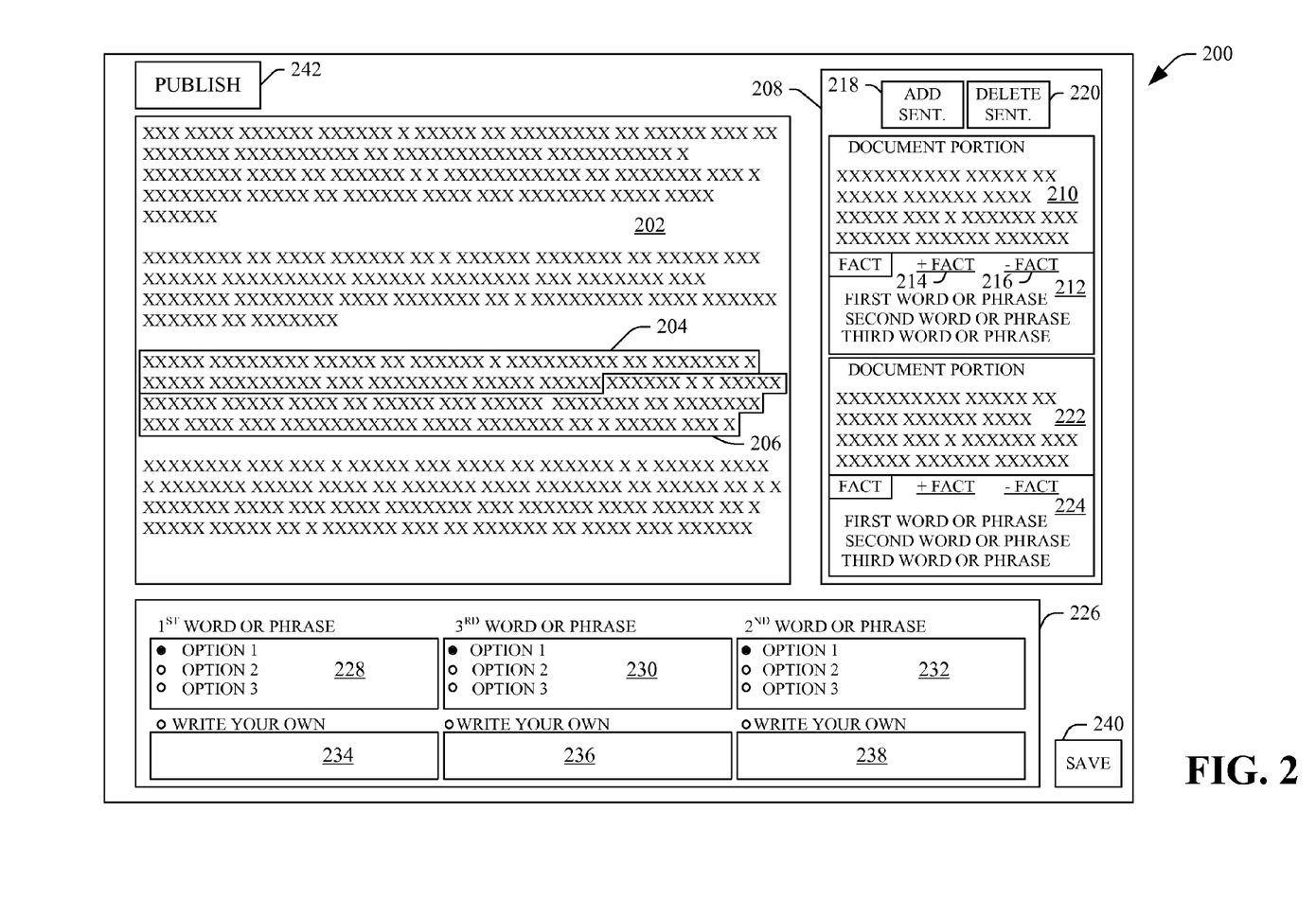
FIG. 2 is an exemplary graphical user interface that facilitates annotating documents.

With reference now to FIG. 2, an exemplary graphical user interface 200 that facilitates assignment of annotations to a document is illustrated. For example, the graphical user interface 200 may correspond to a word processing application, a web browser, or other suitable application. The graphical user interface 200 comprises a first field 202 that is configured to display the document 104 on a display screen of the computing device. As shown, the document 104 displayed in the first field 202 comprises a plurality of different portions of text. It is to be understood, however, that the document 104 shown in the first field 202 can comprise images, links to videos, etc. The portions of text of the document 104 can be sentences, paragraphs, etc.

In the exemplary graphical user interface 200, the user 106 has selected a first portion 204 of the document being displayed in the first field 202 wherein, for instance, the user 106 has selected the first portion 204 of the document 106 through utilization of a cursor, a gesture, a voice command, a touch, etc. Upon selecting the first portion 204 of the document 106 in the first field 202, the first portion 204 can be highlighted in the document 106 to differentiate it from other portions of the document 106 displayed in the first field 202. In an example, the first portion 204 can be a sentence, and the sentence can be highlighted upon the user 106 placing the cursor anywhere in the sentence in the first field 202. A second portion 206 of the document 106 displayed in the first field 202 can also be highlighted to differentiate such portion 206 from the first portion 204 and other portions of the document 106. For instance, the first portion 204 and the second portion 206 can be highlighted in different colors, can be displayed in different fonts, can be displayed in different text sizes, etc.

Further, highlighting the first portion 204 and the second portion 206 in the first field 202 can indicate the first portion 204 and second portion 206 have annotations of the format described above assigned thereto. That is, the first portion 204 and the second portion 206 can have tuples assigned thereto, either automatically by the extractor module 116 or manually by the user.

Responsive to the user 106 selecting the first portion 204 and/or the second portion 206 of the document 104 displayed in the first field 202, a second field 208 in the graphical user interface 200 can be populated with the portions 204 and 206 and/or tuples assigned thereto. The second field 208 can graphically display the portions 204 and 206 of the document 104 displayed in the first field 202 that are highlighted as well as annotations of the aforementioned format that been assigned to the portions 204 and 206. Annotations that are in the form of the tuple described above can also be referred to herein as "facts." Therefore, for instance, responsive to the user 106 selecting the first portion 204 in the document 104 displayed in the first field 202, the first portion 204 can be displayed in a first window 210 of the second field 208. Additionally, the second field 208 may comprise a second window 212 that displays a fact that has been assigned to the first portion 204.

Pursuant to an example, the fact displayed in the second window 212 can be automatically generated by the extractor module 116. If the first portion 204 of the document 104 that was selected by the user 106 in the first field 202 does not have a fact assigned thereto, then, for instance, the second window 112 in the second field 208 can be empty.

The second window 212 can comprise a first button or hyperlink 214 and a second button or hyperlink 216. The first button or hyperlink 214 can cause a fact to be added to the first portion 204 of the document 104 displayed in the first window 210 of the second field 208. For instance, selection of the first button or hyperlink 214 can cause the extractor module 116 to execute over the first portion 204 of the document shown in the first window 210 of the second field 208 and automatically assign a fact to the first portion 204 of the document 104. Alternatively, selection of the first button or hyperlink 214 can cause the fact displayed in the second window 212 to be assigned to the first portion 204 displayed in the first window 210 of the second field 208. In another example, if a fact was previously assigned to the first portion 204 of the document 104, then such fact can be presented in the second window 212 of the second field 208 responsive to the user 106 selecting the first portion 204 of the document 104 in the first field 202. The user 106 can review the fact shown in the second window 212 and, if the user chooses to refrain from assigning the fact shown in the second window 212 to the first portion 204, the user 106 can select the second button or hyperlink 216, which causes the tuple to be deleted and disassociated with the first portion 204 of the document 104. Thus, the hyperlinks or buttons 114 and 116 can allow the user 106 to validate or reject a fact that was automatically assigned to the document 104 by the extractor module 116.

The second field 208 further comprises a pair of buttons 218 and 220, wherein selection of the button 218 by the user 106 can cause a fact to be added to the document 104 while depression of the button 220 can cause a fact to be deleted from the document 104. In an example, the extractor module 116 may not automatically generate a fact for a portion of the document 104 that is of interest to the user 106. The user 106 can manually generate a fact and cause such fact to be assigned to the document 104 through depression of the button 218. Similarly, the user 106 can cause a fact to be removed through depression of the button 220.

The second field 208 may further comprise a third window 222 and a fourth window 224, which are configured to display, for instance, the second portion 206 of the document 104 shown in the first field 202 and any facts that are assigned thereto. Thus, as shown, the second field 208 can include sufficient display screen real estate to depict a plurality of sentences shown in the first field 202 and associated facts. It is to be understood, however, that in some embodiments it may be beneficial to show a single portion (sentence) of a second field 208 and facts corresponding to such single portion rather than using screen real estate to display multiple portions of the document 104.

The graphical user interface 200 can further comprise a third field 226 that includes tools that allow the user 106 to modify facts that were automatically generated by the extractor module 116. Additionally, the third field 226 includes tools that allow the user 106 to manually assign a fact to a portion of the document 104 shown in the first field 102, wherein such portion of the document 104 fails to include an annotation generated by the extractor module 116. In an example, the third field 226 can comprise a fifth window 228, a sixth window 230 and a seventh window 232. The fifth window 228 can be configured to display a plurality of options located by the extractor module 116 that correspond to a first element of the fact, which can be a first word or phrase (a subject). For instance, the fifth window 228 can display a plurality of possible subjects of the first portion 204 of the document 104, as located by the extractor module 116. The sixth window 230 can display another plurality of options found by the extractor module 116 for a second element in the fact, which can be the aforementioned third word or phrase (a predicate or verb that relates the subject to an object). Similarly, the seventh window 232 can comprise a plurality of options located by the extractor module for a third element in the fact (an object that is related to the subject by way of the predicate). Each of the options shown in the fifth window 228, the sixth window 230, and the seventh window 232 can have a radio button or checkbox corresponding thereto, such that the user can select one of the options shown in each of the fifth window 228, the sixth window 230 and the seventh window 232. It is to be understood that in this approach, the format of the fact (tuple) is maintained for all facts assigned to portions of the document shown in the first field 202. Additionally, the options shown in the windows 228-232 allow the user to modify an annotation that was automatically generated by the extractor module 116.

The third field 226 can also comprise a first text entry field 234, a second text entry field 236, and a third text entry field 238. These text entry fields 234-238 are configured to receive user-generated facts or portions of facts (elements of the tuple). For instance, the user 106 may wish to assign a fact to a sentence in the document 104, wherein the extractor module 116 was imperfect in locating options for the fact or was not configured to generate a fact for the sentence. The user 106 can utilize one or more of the text entry fields 234-238 to enter her own fact or portion of a fact. For instance, if the user 106 does not see a desirable option for the second word or phrase shown in the seventh window 232, the user 106 can select a radio button, checkbox, etc. corresponding to the first text entry field 234 and can enter her own text in such text entry field 234. Similarly, for example, if the text entry field 230 does not include a predicate that is desired to be associated with a portion of the document selected by the user 106, then the user 106 can select the radio button, checkbox, etc. corresponding to the second text entry field 236 and can manually enter a desired predicate. Likewise, the user 106 can enter text into the first text entry field 238 to assign a customized subject to the portion 204 of the document 104.

The graphical user interface 200 can further comprise a save button 240, wherein depression of the save button 240 causes a fact modified by way of the third field 226 to be assigned to the portion of text selected by the user 106 and highlighted in the first field 202. The graphical user interface 200 further comprises a publish graphical button 242 that, when selected by the user 106, causes at least one data packet to be generated and transmitted to a to the data store 128 that is accessible to others by way of the network connection. The form of the data packet has been described above.

While the graphical user interface 200 has been shown as having a particular configuration, it is be understood that other configurations are contemplated by the inventors and are intended to fall under the scope of the hereto-appended claims. Specifically, any configuration that allows a user to view a document, select a portion of such document and see facts automatically generated by an extractor module, validate such facts, reject such facts, and/or modify such facts, is intended to fall under the scope of the hereto appended claims.

Figure 3:
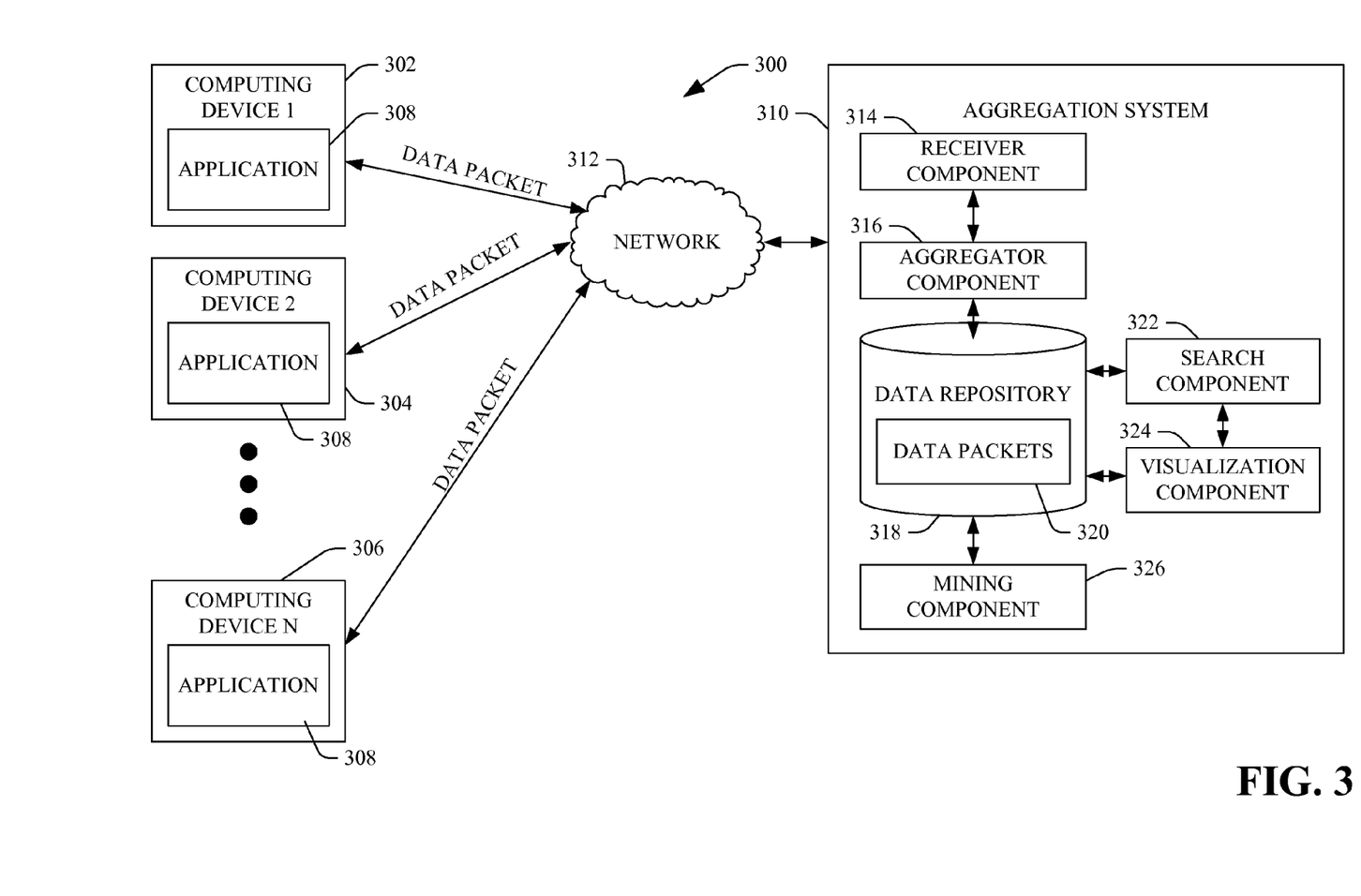
FIG. 3 is a functional block diagram of an exemplary system that facilitates aggregating annotations made to documents from a plurality of users.

Turning now to FIG. 3, an exemplary system 300 that facilitates aggregating facts made to documents by multiple users of different computing devices by way of, for instance, the graphical user interface 200 is illustrated. The system 300 includes a plurality of computing devices 302-306. The plurality of computing devices 302-306 comprises a first computing device 302, a second computing device 304, and an Nth computing device 306. Each of the computing devices 302-306 has an application 308 executing thereon.

Pursuant to an example, a user of the first computing device 302 can initiate the application 308 such that the application 308 is executing on the first computing device 302. The user may cause the application 308 to display a particular document that is desirably reviewed by the user of the first computing device 302. When reviewing such document, the user can generate or review and approve facts that pertain to such document. Thereafter, the user may wish to publish these facts such that the facts can be viewed by others who may also be interested in a particular research field that pertains to the document, etc. Therefore, through utilization of the application 308, the user of the first computing device 302 can choose to publish the facts made to the document was reviewed through utilization of the application 308. For example, the user can indicate that she wishes to publish the facts by way of a selection of the graphical button 242 on the graphical user interface 200, and the publisher component 126 can act to publish such facts.

Upon receiving a command to publish the facts in the document, the application 308 generates a data packet as discussed previously. This data packet can include a fact, which comprises the tuple of a first word or phrase, a second word or phrase, and a third word or phrase that relates the first and second words or phrases. The data packet generated by the application 308 can also include relationship data, wherein the relationship data can identify relationships between the fact included in the data packet and attributes of the document to which the fact is assigned. It is to be understood that multiple reviewers of various different documents can use the application 308 to review and assign facts to such documents and may then choose to publish these facts so the facts can be aggregated and utilized for review/analysis.

The system 300 further comprises an aggregation system 310 that is configured to aggregate data packets transmitted from the computing devices 302-306. For instance, the aggregation system 310 may be in communication with the computing devices 302-306 by way of a suitable network 312. Pursuant to an example, the network 312 can be the Internet. In another example, the network 312 may be a cellular network, an intranet, or other suitable network such as a local area network, a wireless area network, etc. Responsive to, for instance, the user of the first computing device 302 choosing to publish facts corresponding to the document being reviewed by way of the application 308, at least one data packet is transmitted from the first computing device 302 to the aggregation system 310 by way of the network 312. Furthermore, is to be understood that each of the computing devices 302-306 may transmit multiple data packets to the aggregation system 310 by way of the network 312.

The aggregation system 310 can comprise a plurality of components that are executable by a processor. Therefore, the aggregation system 310 may be included in, for instance, a server system that comprises at least one processor and corresponding memory, wherein components and memory are accessible and executable by the processor. The plurality of components may comprise a receiver component 314 that receives a data packet transmitted by way of the application 308 executing on the first computing device 302. As described above, the data packet has a first format that includes a tuple and corresponding relationship data. The tuple has been assigned to a portion of a document being reviewed by the user by way of the application 308 and the tuple comprises a plurality of elements (the first word or phrase, second word or phrase, and third word or phrase that relates the first word or phrase to the second word or phrase).

Further, the relationship data in some way relates the tuple with the document to which the tuple was assigned.

The aggregation system 310 further comprises an aggregator component 316 that is in communication with receiver component 314, wherein the aggregator component 316 is configured to aggregate a data packet received by the receiver component 314 with other data packets of the same format in a data repository 318. In other words, each fact comprises a tuple that includes, for instance, a subject, predicate, object, triple. The aggregator component 316 can cause a plurality of different data packets that were received from a plurality of different computing devices with respect to a plurality of different documents that were assigned a plurality of different tuples to be retained in the data repository 318 as data packets 320. The aggregator component 316, for instance, can be configured to aggregate the data packets 320 in the data repository 318 in some suitable database format such that the data packets 320 are readily processable by a computer processor. This aggregation of multiple tuples pertaining to multiple different documents by different annotators creates a network of knowledge that was heretofore unavailable. In other words, the data packets 320 can be aggregated in the data repository 318 by the aggregator component 316 in a format suitable for a processor to perform at least one processing function over at least one of the data packets in the data packets 320.

For instance, the aggregation system 310 may optionally include a search component 322 that can receive a query by way of the network 312 and execute a search over the data packets 320 in the data repository 318 based at least in part upon the query. For example, the query received by the search component 322 can include a word or phrase. The search component 322 can be configured to search for facts in the data packets 320 that comprise the word or phrase. The search component 322 may also be configured to output search results to the user responsive to execution of the search over the data packets 320, wherein the search results can include tuples that comprise a word or phrase in the query (or related words or phrases), as well as relationship data corresponding to such tuples. In another example, the search component 322 can receive the name of an author as a query and the search component 322 can retrieve annotations or facts in the data packets 320 that were authored by the author or were assigned documents that were authored by such author.

The aggregation system 310 may further optionally comprise a visualization component 324 that can visualize tuples and relationships in the data packets 320. Pursuant to an example, the visualization component 324 can be in communication with the search component 322 and can visualize relationships between facts and corresponding documents/authors/other annotations retrieved by the search component 322.

The aggregation system 310 may further optionally include a mining component 326 that performs a data mining function over the data packets 320 in the data repository 318. For instance, the mining component 326 may be configured to search for patterns in the data packets 320 retained in the data repository 318 such that, for example, identities of authors that comment on a particular topic frequently can be ascertained, identities of authors that are frequently co-cited, can be ascertained, etc. Relationships or patterns located by the mining component 326 can be output or can influence searches undertaken by the search component 322.

Figure 4:
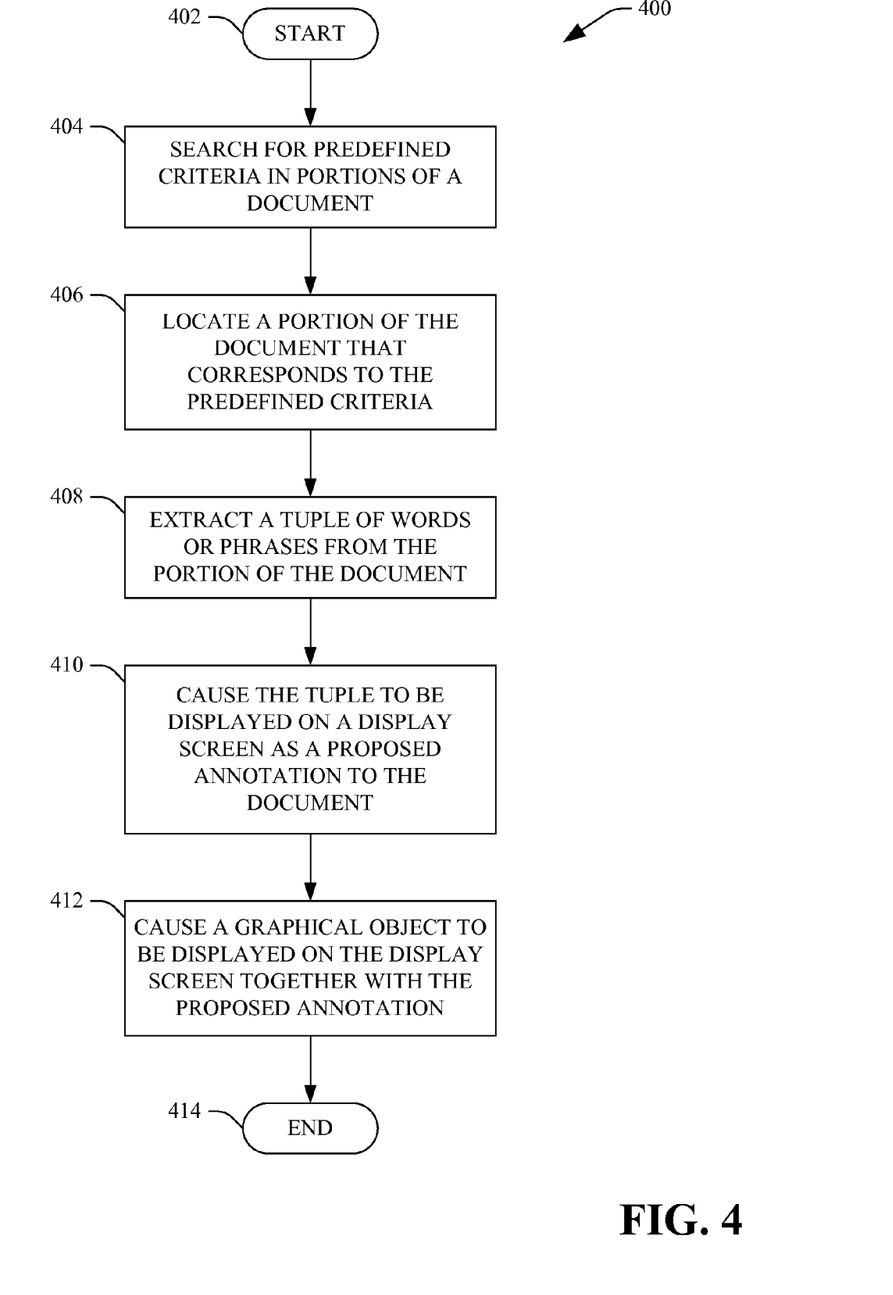
FIG. 4 is a flow diagram that illustrates an exemplary methodology for providing a user with options to validate, reject or modify an automatically generated annotation to a document.
Figure 5:
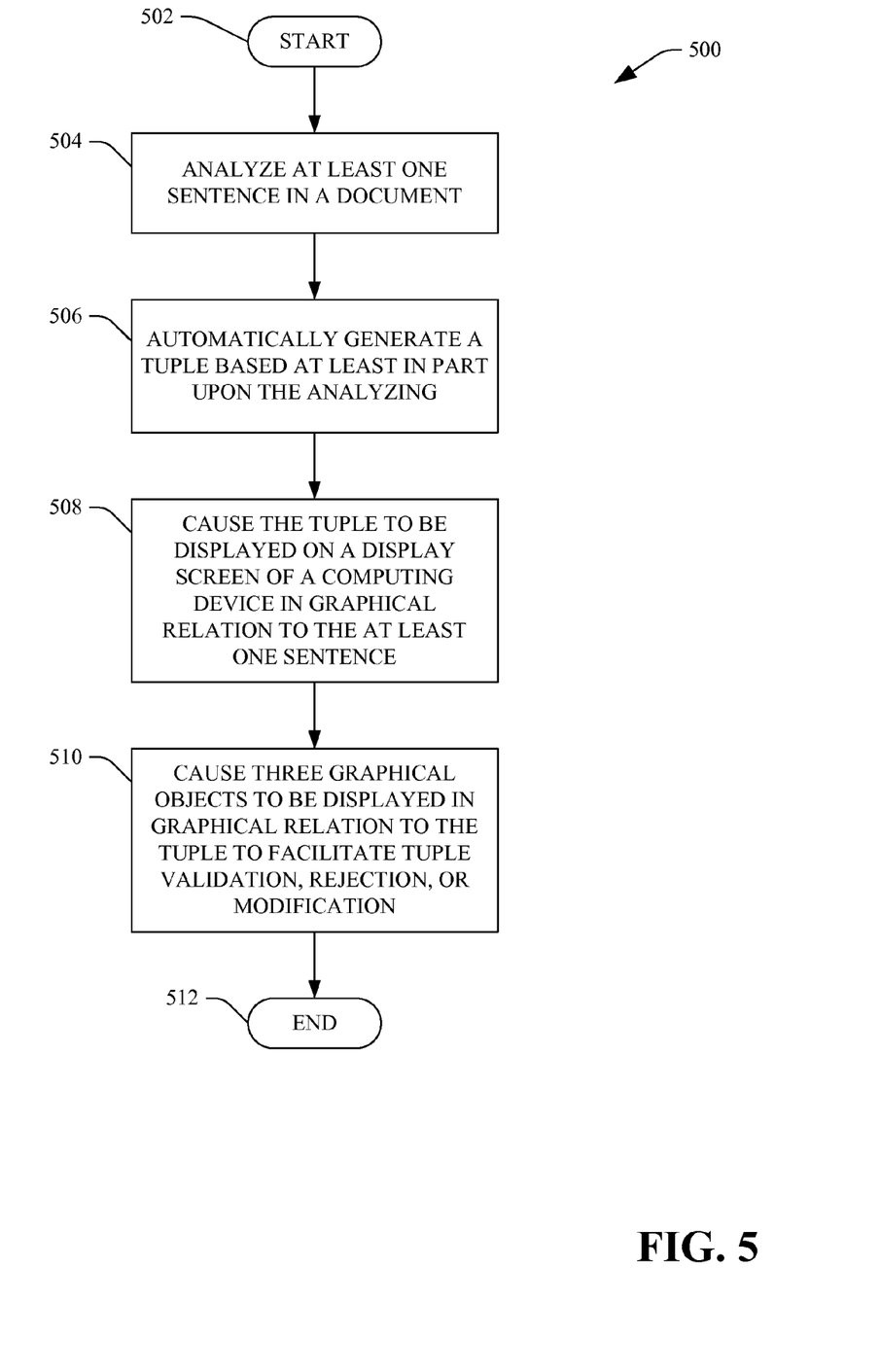
FIG. 5 is a flow diagram that illustrates an exemplary methodology for providing the user with a graphical user interface that facilitates validation, rejection or modification of an automatically generated annotation.

With reference now to FIGS. 4-5, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be a non-transitory medium, such as memory, hard drive, CD, DVD, flash drive, or the like.

With reference now to FIG. 4, a methodology 400 that facilitates assigning annotations (tuples) to documents is illustrated. The methodology 400 starts at 402, and at 404, a processor is caused to search for content in a document that corresponds to predefined criteria. In other words, predefined criteria is searched for over different portions of a document such as sentences, paragraphs etc. The predefined criteria may be a particular sentence structure, a particular word or phrase, or the like. As described above, this predefined criteria may be searched over by an extractor module. Accordingly, the user may select a particular extractor module from amongst a plurality of available extractor modules. Thus, the user can select certain predefined criteria from amongst a plurality of different predefined criteria.

At 406, a portion of a document that corresponds to the predefined criteria is located. Again, this portion of the document can be located based at least in part upon the search performed for the predefined criteria. Accordingly, the extractor module selected by the user has located a portion of a document that has the predefined word or phrase, has the appropriate sentence structure, etc.

At 408, a tuple of words or phrases is extracted from the portion of the document or in the tuple of words or phrases comprises a plurality of ordered elements (words or phrases). The plurality of ordered elements includes a first word or phrase, a second word or phrase, and a third word or phrase that relates the first word or phrase to the second word or phrase, Pursuant to a particular example, the elements of the tuple can be a subject, predicate, object, triple. That is, the extractor module can have natural language processing functionality corresponding thereto and can automatically identify and extract subject, object, predicate, triples from sentences in the document.

At 410, the tuple extracted at 408 is caused to be displayed on a display screen as a proposed annotation to the document. For instance, the tuple can be displayed in graphical relation to the portion of the document to which the tuple corresponds.

At 412, a user-selectable graphical object is caused to be displayed on the display screen in graphical relation with the proposed annotation to the document. This user selectable graphical object, when selected by the user, can cause the tuple to be one of validated by the user, rejected by the user, or modified by the user. That is, the user selectable graphical object can be a graphical button, for instance, that causes the proposed annotation to be validated by the user such that the proposed annotation is saved in a data repository in relation to the document or as part of the document. In another example, the user-selectable graphical object can be a button that causes the proposed annotation to be disassociated with a document or entirely deleted. In still yet another example, the user selectable graphical object can be a button that when selected causes an element of the tuple to be replaced with another proposed element of the tuple. For instance, an extractor module may output several possible words or phrases for a particular element in the tuple and these different options can have radio buttons corresponding thereto. Accordingly, selection of the radio button or checkbox can cause the tuple to be modified. In yet another example, the graphical object can be a text entry field such that the user can replace an element in the proposed annotation (tuple) with a manually generated element. The methodology 400 completes at 414.

Turning now to FIG. 5, an exemplary methodology 500 that facilitates annotating a document is illustrated. The methodology 500 starts at 502, and at 504 at least one sentence in a document is analyzed responsive to input from a user. More particularly, responsive to input from the user, at least one sentence in a document can be analyzed, wherein the document is displayed to the user by way of a word processing application that is executing on a computing device.

At 506, a tuple is automatically generated based at least in part upon the analyzing of the at least one sentence in the document. In the exemplary methodology 500, the tuple comprises a subject, object, predicate, triple.

At 508, the tuple is caused to be displayed on a display screen of the computing device in graphical relation to the at least one sentence. In other words, the tuple is shown as a proposed annotation with respect to the at least one sentence.

At 510, three graphical objects are caused to be displayed in graphical relation to the tuple to facilitate tuple validation, rejection, or modification of the tuple. With more particularity, a first graphical object, a second graphical object, and a third graphical object are caused to be displayed on the computing device in graphical relation with the tuple. User selection of the first graphical object indicates user validation of the tuple, user selection of the second graphical objects indicates user rejection of the tuple, and user selection of the third graphical objects indicates that the user wishes to modify at least one element of the tuple. The methodology 500 completes at 512.

Figure 6:
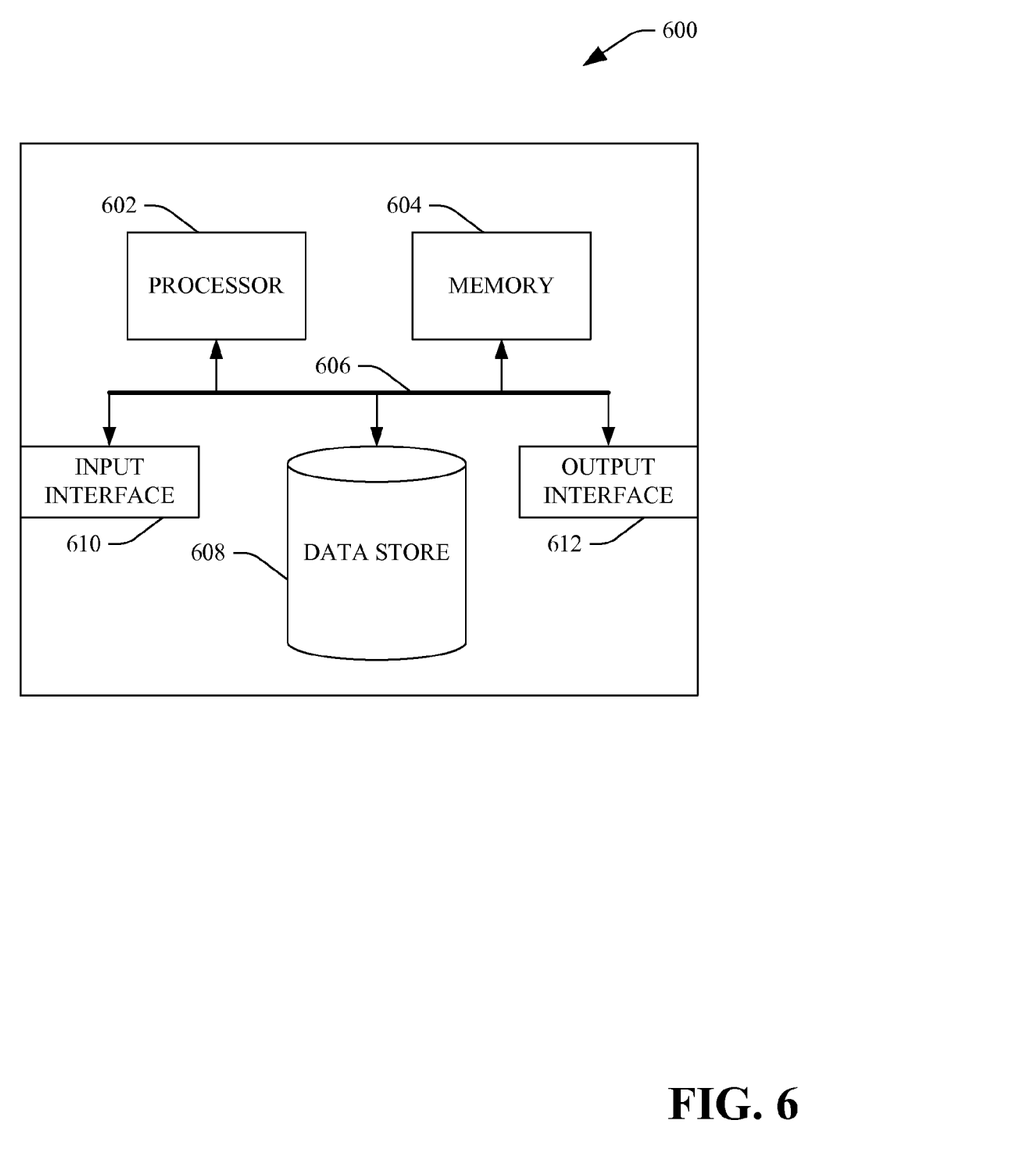
FIG. 6 is an exemplary computing system.

Now referring to FIG. 6, a high-level illustration of an exemplary computing device 600 that can be used in accordance with the systems and methodologies disclosed herein is illustrated. For instance, the computing device 600 may be used in a system that supports automatic annotation of documents. In another example, at least a portion of the computing device 600 may be used in a system that supports validation, rejection, or modification of an automatically generated tuple. The computing device 600 includes at least one processor 602 that executes instructions that are stored in a memory 604. The memory 604 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 602 may access the memory 604 by way of a system bus 606. In addition to storing executable instructions, the memory 604 may also store extractor modules, documents, annotations to documents, relationship data, etc.

The computing device 600 additionally includes a data store 608 that is accessible by the processor 602 by way of the system bus 606. The data store may be or include any suitable computer-readable storage, including a hard disk, memory, etc. The data store 608 may include executable instructions, documents, relationship data, tuples, etc. The computing device 600 also includes an input interface 610 that allows external devices to communicate with the computing device 600. For instance, the input interface 610 may be used to receive instructions from an external computer device, from a user, etc. The computing device 600 also includes an output interface 612 that interfaces the computing device 600 with one or more external devices. For example, the computing device 600 may display text, images, etc. by way of the output interface 612.

Additionally, while illustrated as a single system, it is to be understood that the computing device 600 may be a distributed system. Thus, for instance, several devices may be in communication by way of a network connection and may collectively perform tasks described as being performed by the computing device 600.

As used herein, the terms "component", "system", and "module" are intended to encompass hardware, software, or a combination of hardware and software. Thus, for example, a component, system, or module may be a process, a process executing on a processor, or a processor. Additionally, a component, system, or module may be localized on a single device or distributed across several devices. Furthermore, a component, system, of module may refer to a portion of memory and/or a series of transistors.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method executed by a processor of a computing device, the method comprising:
   receiving a request to generate an annotation for a document;
   responsive to receiving the request, utilizing natural language processing techniques to generate the annotation for the document based upon content of a portion of the document, wherein the annotation is in the form of a subject, object, predicate tuple;
   responsive to generating the annotation for the document, causing a graphical user interface to be presented on a display, the graphical user interface comprises:
   at least one field that displays the subject, the predicate, and the object
   a first graphical object; and
   a second graphical object, wherein when the first graphical object is selected the annotation is validated and assigned to the portion of the document, and when the second graphical object is selected the annotation is rejected and the graphical user interface is updated to comprise at least one text entry field that is configured to receive user alterations to one or more of the subject, the predicate, or the object.

2. The method of claim 1, the computing device being a mobile computing device.

3. The method of claim 1, wherein generating the annotation for the document comprises:
   receiving a text string;
   identifying that the portion of the document comprises the text string; and
   generating the annotation based upon text in the portion of the document that comprises the text string.

4. The method of claim 1, further comprising:
receiving a selection of the second graphical object in the graphical user interface;
subsequent to receiving the selection of the second graphical object in the graphical user interface, receiving text in the text entry field;
receiving a selection of the first graphical object; and
saving the text in the text entry field as at least a portion of the annotation.

5. The method of claim 1, wherein the receiving, the generating, and the causing are performed by a word processing application being executed by the processor.

6. The method of claim 5, the word processing application executing on a server computing device, wherein causing the graphical user interface to be presented on the display comprises causing the graphical user interface to be presented in a web browser on a client computing device that is in communication with the server computing device.

7. The method of claim 1, the computing device being a client computing device, the further comprising:
receiving an indication that the first graphical object has been selected;
responsive to receiving the indication, transmitting the annotation to a network-accessible data repository, the network-accessible data repository accessible to other client computing devices.

8. The method of claim 7, wherein the annotation further comprises at least one of an author of the document or an author of the annotation.

9. The method of claim 1,
wherein the at least one text entry field comprises:
a first field that is configured to receive a replacement for the object; and
a second field that is configured to receive a replacement for the predicate.

10. The method of claim 9, wherein the at least one text entry field further comprises a third field that is configured to receive a replacement for the predicate.

11. A system comprising:
a processor; and
memory that comprises an application that is executed by the processor, wherein the application, when executed by the processor, causes the processor to perform acts comprising:
causing a document to be displayed on a display;
generating, through utilization of natural language processing, an annotation with respect to a portion of the document displayed on the display, wherein the annotation has the form of a subject, object, predicate tuple, and wherein the annotation is generated based upon a sentence in the portion of the document; and
causing a graphical user interface to be presented on the display responsive to the annotation being generated, the graphical user interface includes:
a first selectable graphical object, wherein responsive to the first graphical object being selected, the annotation is assigned to the portion of the document;
a second selectable graphical object, wherein responsive to the second graphical object being selected, at least one text entry field is presented in the graphical user interface, wherein the at least one text entry field is configured to receive an update to at least one of the subject, the object, or the predicate.

12. The system of claim 11, the application being a web browser.

13. The system of claim 11, the application being a word processing application.

14. The system of claim 11, wherein the at least one text entry field comprises a first text entry field and a second text entry field, the first text entry field configured to receive an update to the object, the second text entry field configured to receive an update to the subject.

15. The system of claim 11, the acts further comprising publishing the annotation to a network-accessible data repository responsive to receipt of a selection of the first selectable graphical object.

16. The system of claim 11, the acts further comprising receiving an indication that the portion of the document has been selected, wherein the annotation is generated responsive to receiving the indication.

17. The system of claim 11, the acts further comprising:
receiving a selection of the first graphical object; and
responsive to receiving the selection of the first graphical object, highlighting the portion of the document to indicate that the annotation has been assigned thereto.

18. A computing system comprising:
a processor; and
memory that stores instructions that, when executed by the processor, cause the processor to perform acts comprising:
receiving a selection of a portion of a document, the portion of the document includes a sentence;
responsive to receiving the selection of the portion of the document, and utilizing natural language processing over the portion of the document, generating an annotation for the portion of the document, the annotation in the form of a subject, object, predicate tuple;
responsive to generating the annotation, causing a graphical user interface to be presented on a display, the graphical user interface comprises:
fields that respectively depict the subject, the object, and the predicate;
text entry fields that are configured to receive modifications to the subject, the object, and the predicate, respectively; and
a graphical object, wherein the annotation is published to a network-accessible data store and assigned to the portion of the document responsive to the graphical object being selected.

19. The computer-readable memory of claim 18, the graphical user interface further comprises the portion of the document, wherein the portion of the document is highlighted in the graphical user interface.

20. The computer-readable memory of claim 18, wherein a web browser includes the graphical user interface.

* * * * *